(12) United States Patent
Shimozaki

(10) Patent No.: US 7,360,226 B2
(45) Date of Patent: Apr. 15, 2008

(54) DISK PLAYER

(75) Inventor: Mitsuhiro Shimozaki, Gunma (JP)

(73) Assignee: Shinwa Kabushiki Kaisha, Tokyo (JP)

( * ) Notice: Subject to any disclaimer, the term of this patent is extended or adjusted under 35 U.S.C. 154(b) by 589 days.

(21) Appl. No.: 10/493,725

(22) PCT Filed: Jan. 24, 2003

(86) PCT No.: PCT/JP03/00656

§ 371 (c)(1),
(2), (4) Date: Oct. 19, 2004

(87) PCT Pub. No.: WO03/075270

PCT Pub. Date: Sep. 12, 2003

(65) Prior Publication Data

US 2005/0086672 A1 Apr. 21, 2005

(30) Foreign Application Priority Data

Mar. 4, 2002 (JP) .............................. 2002-057691

(51) Int. Cl.
*G11B 17/04* (2006.01)
(52) U.S. Cl. ..................................................... 720/619
(58) Field of Classification Search ................ 720/619, 720/624, 661
See application file for complete search history.

(56) References Cited

U.S. PATENT DOCUMENTS 6,411,582 B1 * 6/2002 Nakatani et al. ............ 720/620
6,597,651 B1 7/2003 Kage et al.
6,741,541 B2 * 5/2004 Akatani et al. ............. 720/661
6,772,426 B2 * 8/2004 Akatani ...................... 720/624

FOREIGN PATENT DOCUMENTS

| JP | 07272417 A | * | 10/1995 |
| JP | 10003722 A | * | 1/1998 |
| JP | 11-195262 | | 7/1999 |
| JP | 2000-298903 | | 10/2000 |
| JP | 2000-298903 A | | 10/2000 |
| JP | 2001-283493 | | 10/2001 |
| JP | 2001-283493 A | | 10/2001 |
| JP | 2002-298519 A | | 10/2002 |

* cited by examiner

*Primary Examiner*—David Davis
(74) *Attorney, Agent, or Firm*—Dennis G. LaPointe

(57) ABSTRACT

A drive gear (30) is rotated by a motor (28). Drive force from a loading transmission gear (36), which constantly engages the drive gear (30), is constantly transmitted to a loading mechanism (20). In a pick-up moving mechanism (24), an idler gear (33), which constantly engages the drive gear (30), engages a pick-up transmission gear (82) to transmit drive force. The movement of a first slider (101) engages and disengages the idler gear (33) and the pick-up transmission gear (82). The first slider (101) is located at a first position when a disc (D) is not loaded, and is located at a second position when the disc (D) is loaded. A loading mechanism (20) ends a loading operation by moving the first slider (101) to a second position. The transmission and switching of drive force from a single motor to the loading mechanism (20) and the pick-up moving mechanism (24) is ensured.

6 Claims, 15 Drawing Sheets

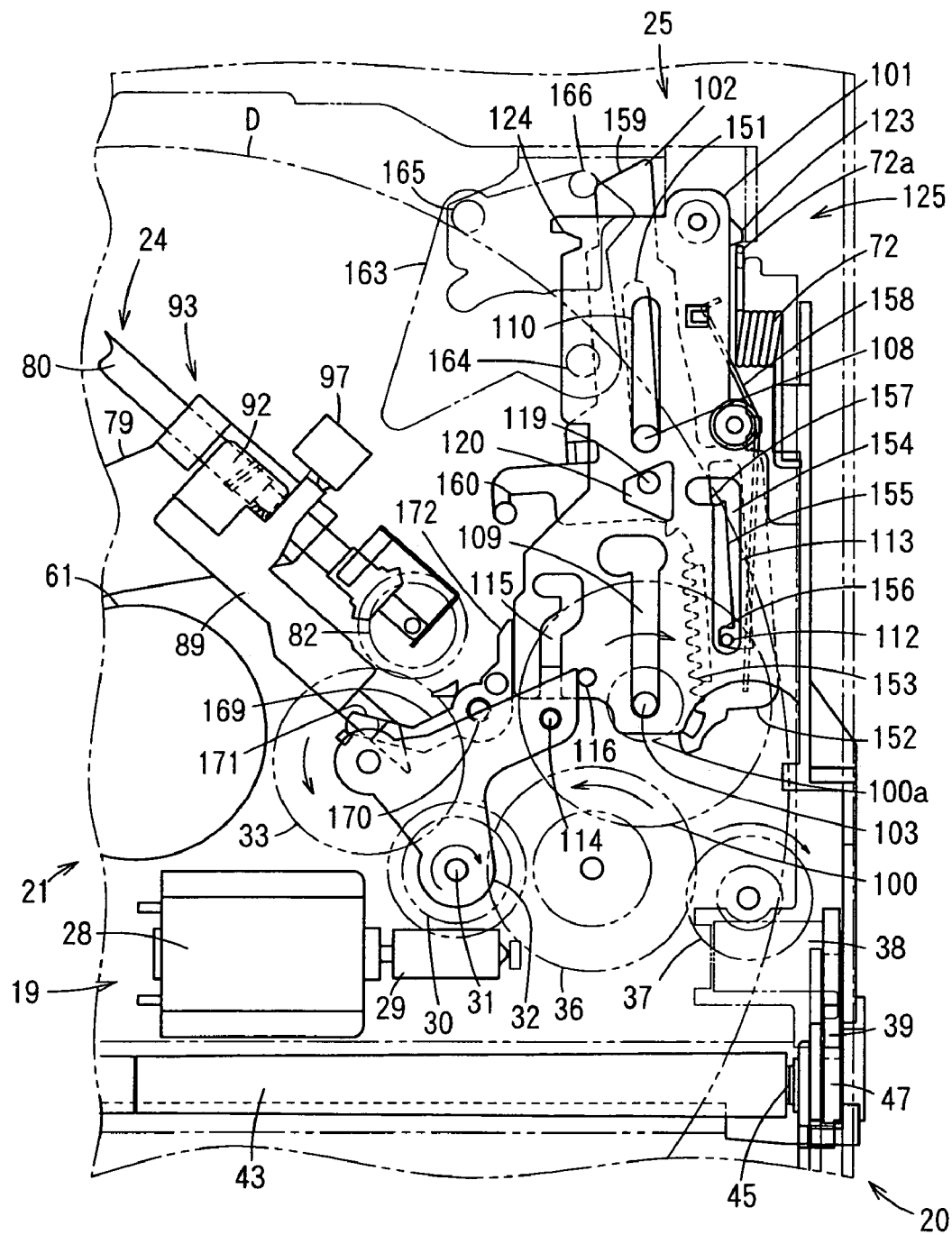
F I G. 1

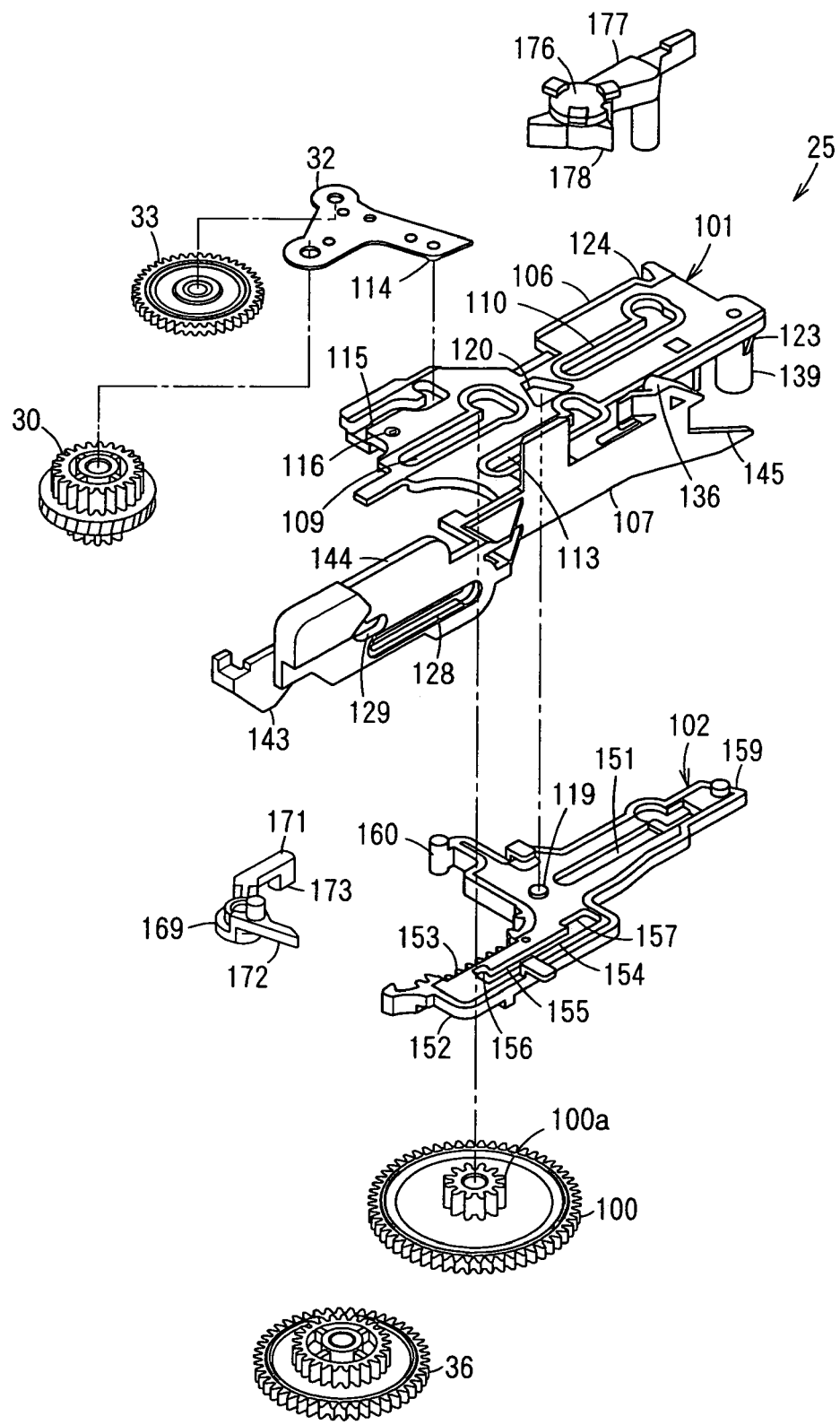
F I G. 4

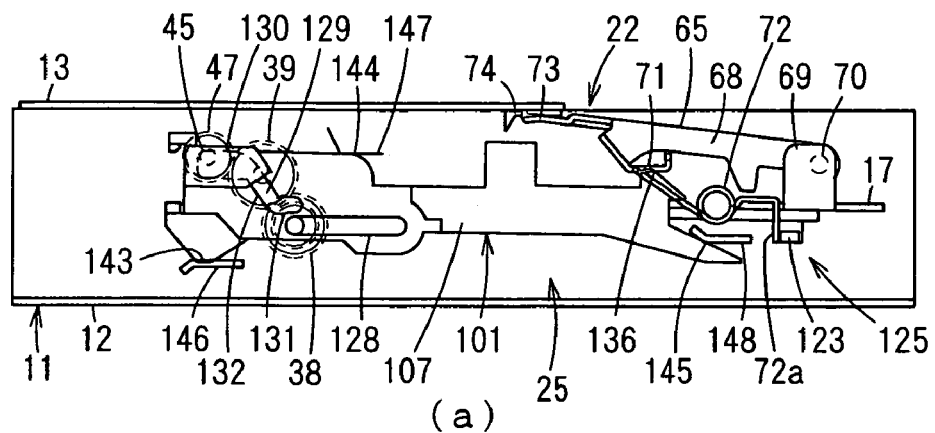
(a)
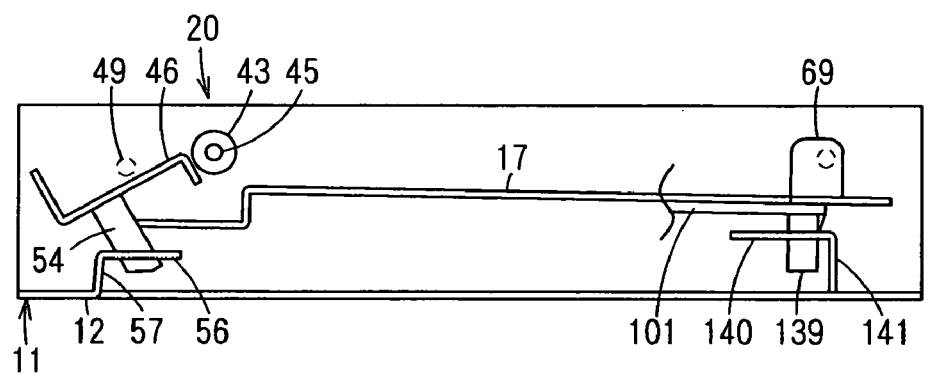
(b)
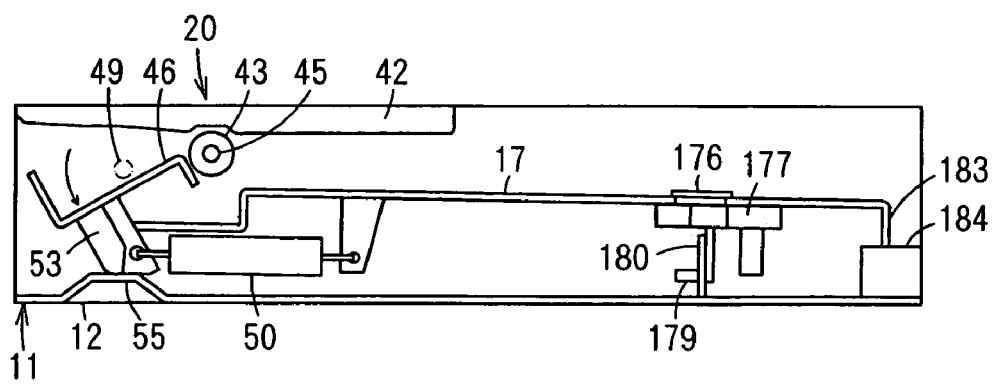
(c)
F I G. 5

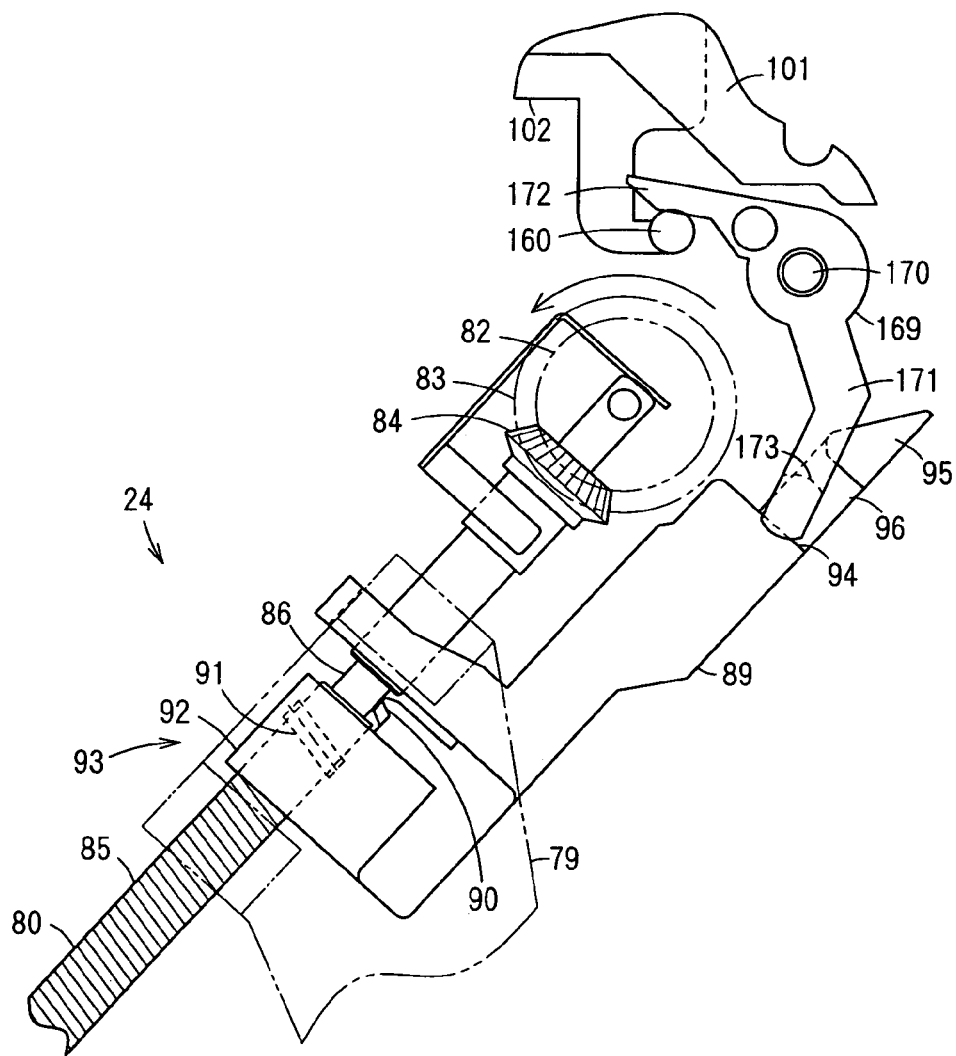
F I G. 7

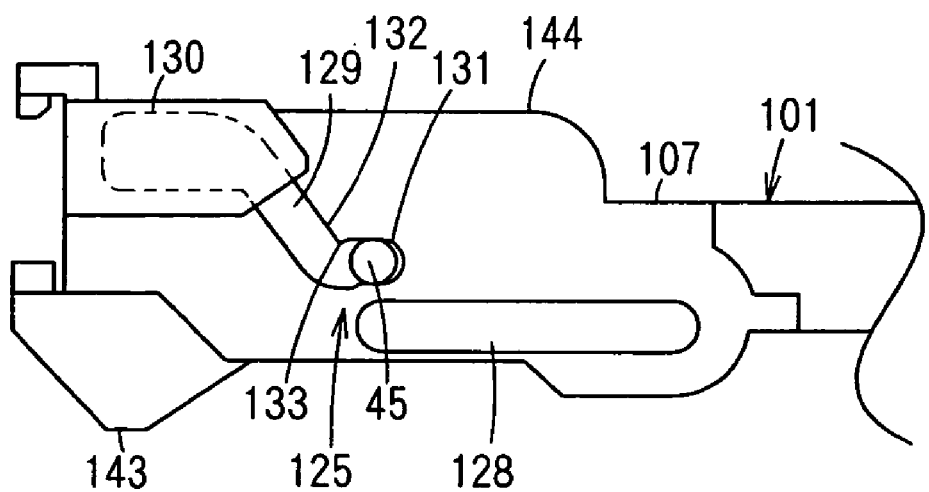
F I G. 8

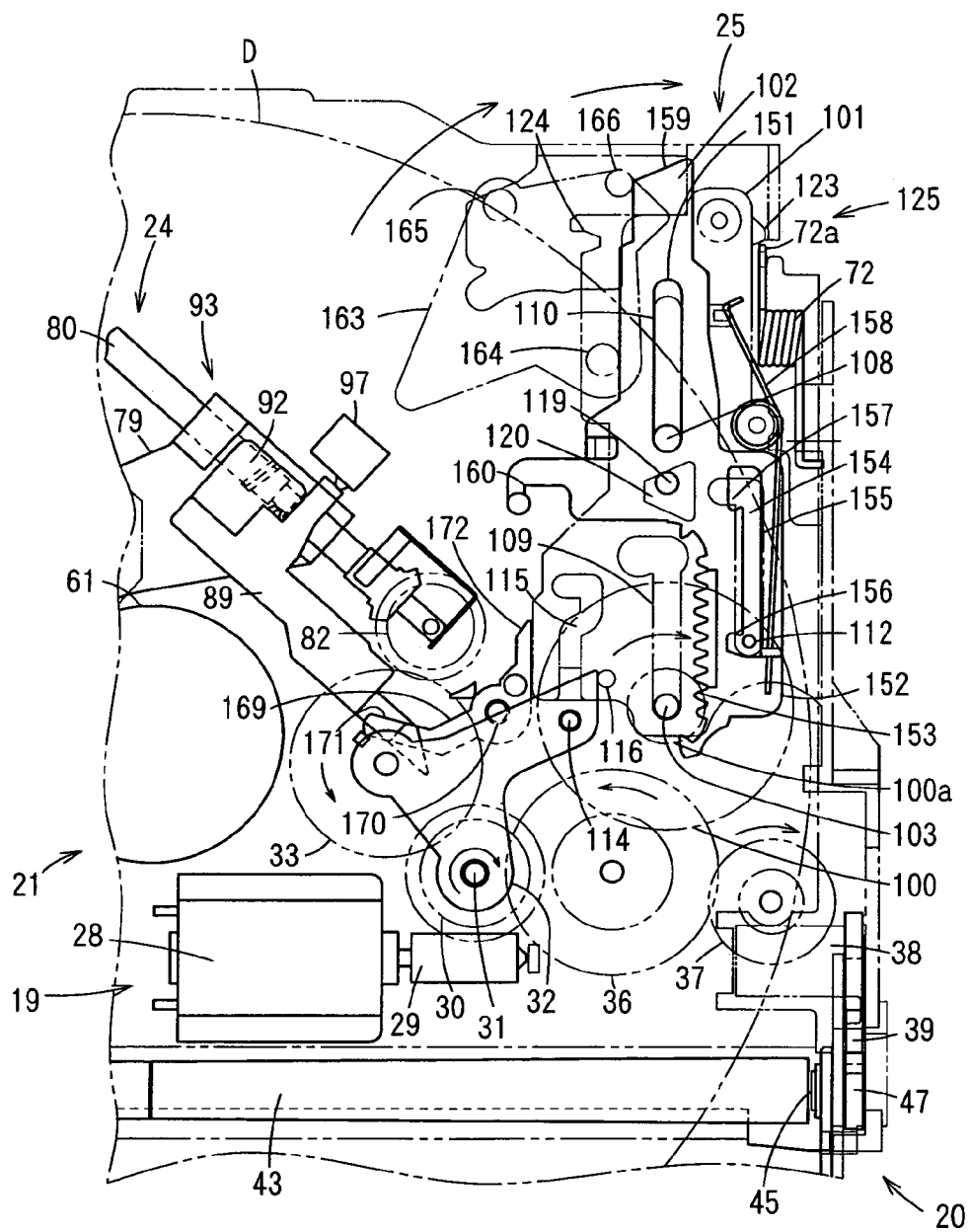
F I G. 9

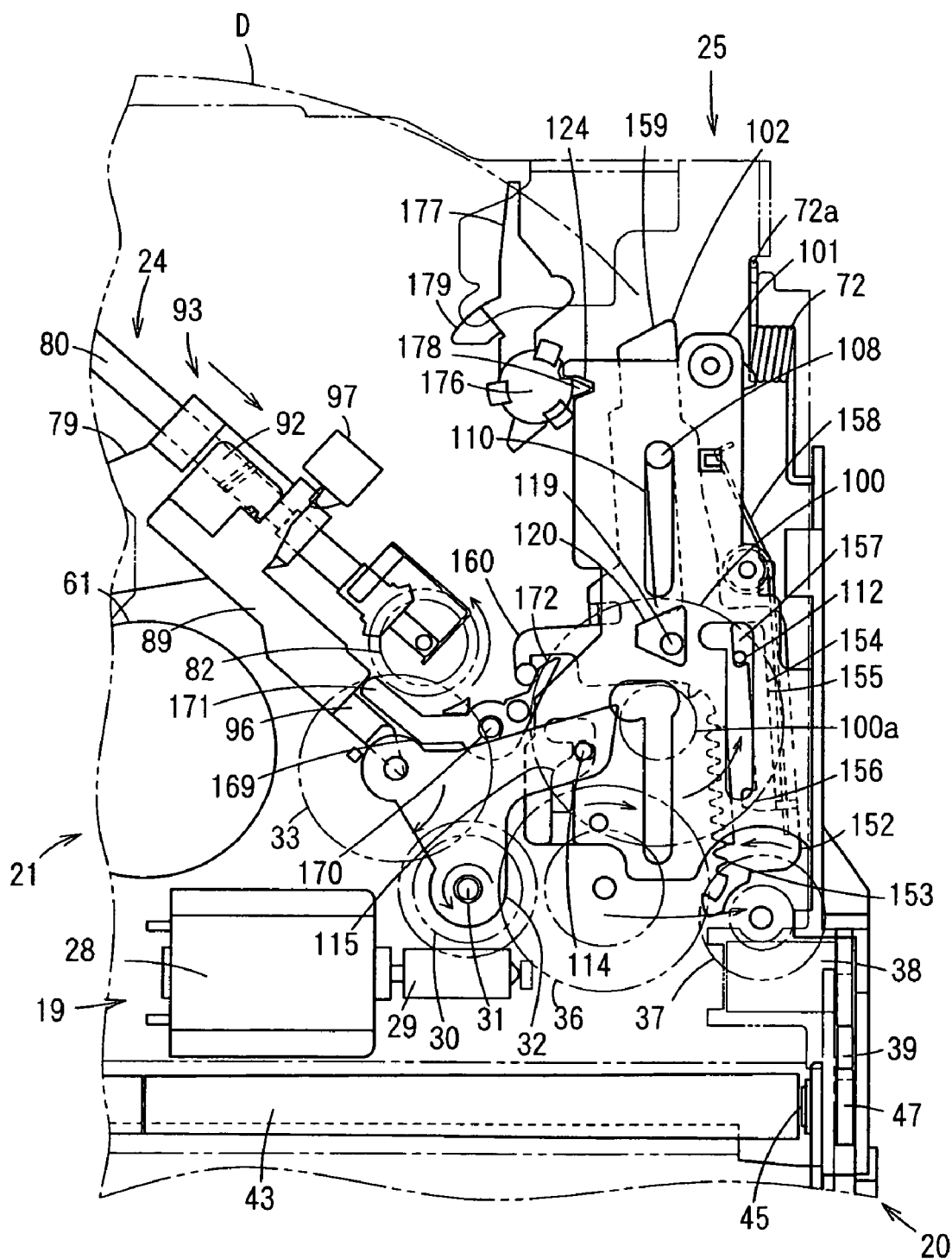
F I G. 11

(a)

(b)

(c)

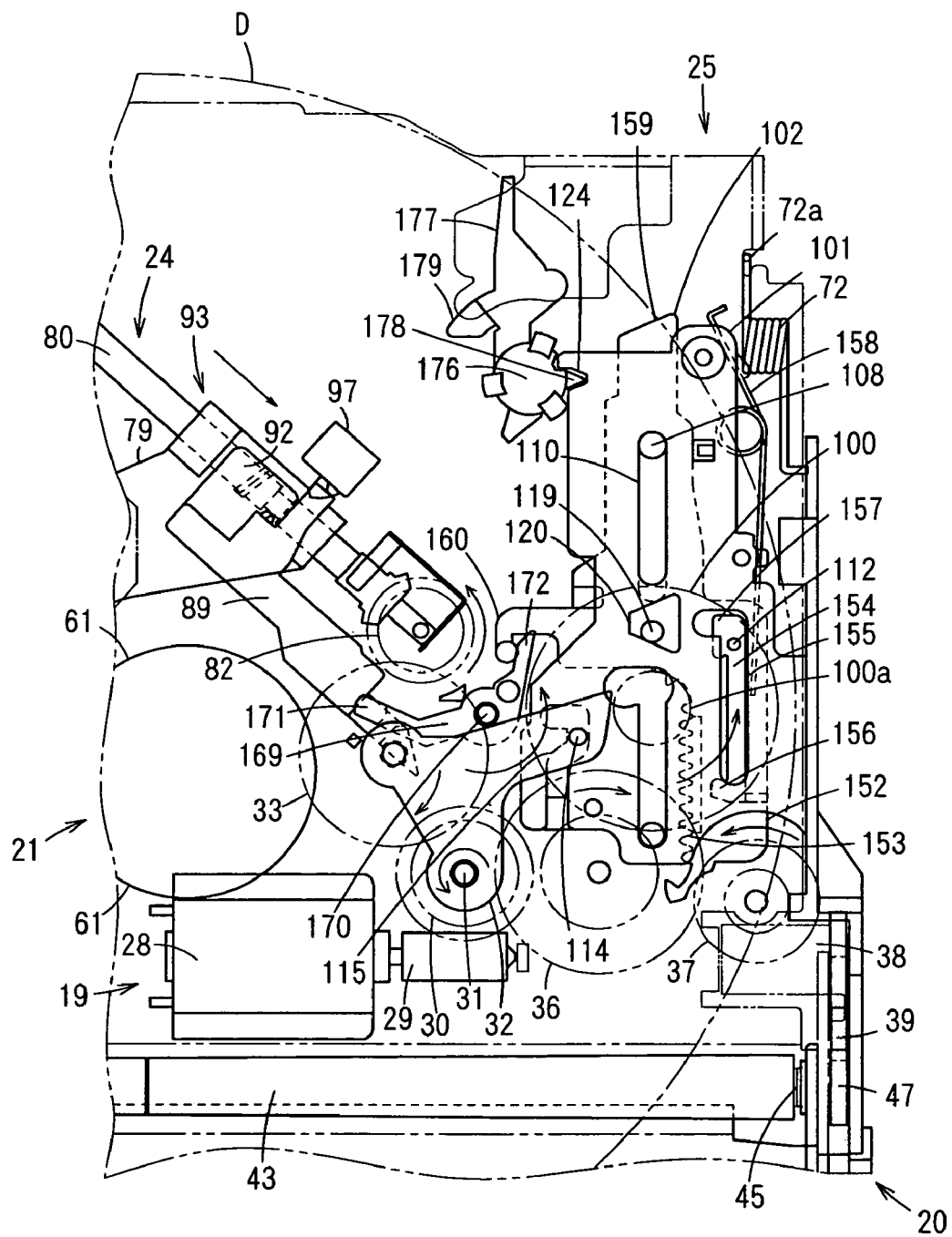
F I G. 14

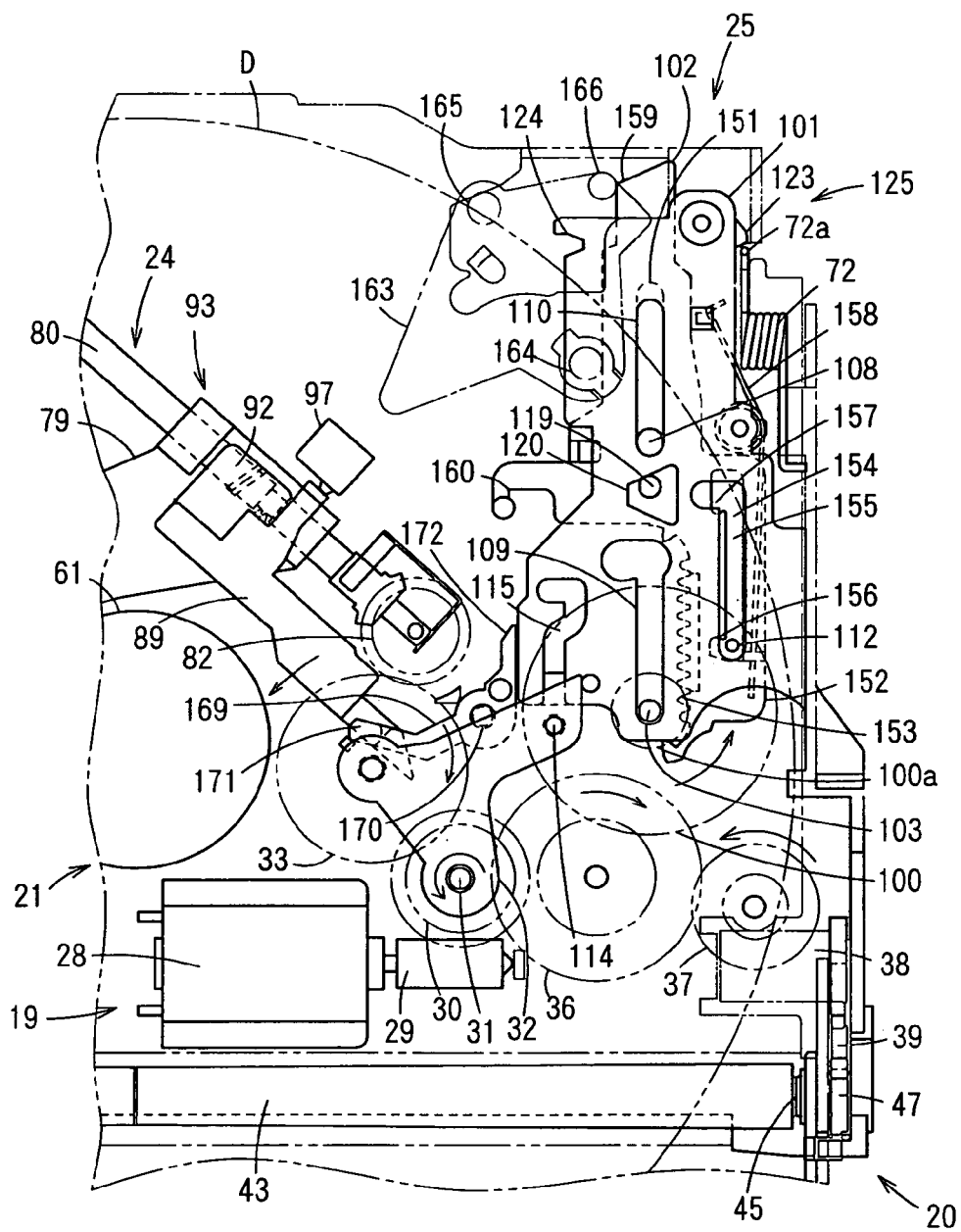
F I G. 15

DISK PLAYER

TECHNICAL FIELD

The present invention relates to a disc drive device for driving a loading mechanism and pick-up moving mechanism using a single motor.

BACKGROUND ART

In the conventional art, for example, among disc players for compact discs used to reproduce music and the like, there are known to be disc players that reduce the number of motors by using a drive switching mechanism to selectively drive a loading mechanism and pick-up moving mechanism using a single motor, as is disclosed, for example, in Japanese Laid-Open Patent Publication No. 2000-298903.

This disc player is provided with an idler plate, which is rotatable about the axis of a drive gear that is rotated by drive force from a motor and which functions as a drive switching mechanism. The idler plate is rotated to a disc loading position for transmitting drive force to the loading mechanism or to a pick-up moving position for transmitting drive force to the pick-up moving mechanism in accordance with the rotation direction of the drive gear by means of the friction generated between the drive gear and an idler gear provided on the idler plate. This switches the transmission of the drive force from the idler gear to one or another of the loading mechanism or the pick-up moving mechanism.

In disc players of this structure, a problem of operational instability occurs because a neutral point is generated in the transmission of the drive force at which the drive force of the drive gear is not transferred from the idler gear to both the loading mechanism and the pick-up moving mechanism during the rotation of the idler plate. When the drive transmission is switched by moving the idler gear between the loading mechanism and the pick-up moving mechanism, the operation is prevented from becoming unstable by moving the idler gear so as to engage an intermediate member arranged between the loading mechanism and the pick-up moving mechanism.

Therefore, in a conventional disc player structure, a problem of operational instability occurs because a neutral point is generated in the drive force transmission at which the drive force of the drive gear is not transferred from the idler gear to both the loading mechanism and the pick-up moving mechanism during the rotation of the idler plate, and it becomes necessary to use a special intermediate member to solve the problem. This leads to further problems of increasing the number of parts and making the structure more complex.

Further problems of increasing structural complexity and increasing size arise due to the need for a special locking means for locking the idler plate at each position when it is rotated to the disc loading position or the pick-up moving position, in order to allow the loading mechanism or pick-up moving mechanism to operate freely, and to allow forward and reverse rotation of the motor.

It is an object of the present invention to provide a disc drive device capable of reliably transmitting and switching drive force from a single motor to a loading mechanism and a pick-up moving mechanism.

DISCLOSURE OF INVENTION

A disc drive device includes a drive source, a transporting means for performing an operation of transporting a disc with the transmission of power from the drive source, a moving means for moving a pick-up for reading information from the disc, and a power switching means for transmitting power to the moving means. The power switching means maintains a first position until the disc is moved by the transporting means to a loading position, moves to a second position when the disc reaches the loading position, stops the transport operation of the disc until reaching the second position, and transmits power to the moving means.

A disc transport operation is implemented by the transporting means by transmitting power from the drive source, the power switching means is maintained at the first position until a disc is transported to the loading position by the transporting means, the power switching means is moved to the second position when the disc arrives at the loading position, and the disc transport operation is stopped until the power switching means arrives at the second position and power is transmitted to the moving means for moving the pick-up. Therefore, since there is no neutral point in the transmission of the drive force at which the drive force is not transmitted to both the transporting means and the moving means, the operational stability is achieved, and separate parts are not required to achieve this operational stability. This provides reliable transmission and switching of the drive force from a single drive source.

Further, a disc drive device of the present invention includes a drive gear rotated by a motor, a loading mechanism, which constantly engages the drive gear and to which drive force is transmitted for loading and unloading a disc, a pick-up moving mechanism for moving a pick-up, an idler gear constantly engaging the drive gear and separably engaging the pick-up moving mechanism, a first slider moved between a first position, which is maintained when a disc is not loaded at a recording reproduction position, to engage and disengage the idler gear and the pick-up moving mechanism, and a second slider for moving the first slider when power is transmitted from the drive gear.

In the loading mechanism, drive force is constantly transmitted to the loading mechanism, which constantly engages a drive gear rotated by a single motor. Further, the pick-up moving mechanism, engages and disengages an idler gear, which constantly engages the drive gear, such that the pick-up moving mechanism engages and disengages the idler gear by means of a first slider moved to a first position, which is maintained when a disc is not loaded, and a second position, which is maintained when a disc is loaded. Thus, since there is no neutral point in the transmission of the drive force at which the drive force is not transmitted to both the loading mechanism and the pick-up moving mechanism, operational stability is achieved, and separate parts are not required to achieve this operational stability, thereby providing reliable transmission and switching of the drive force from a single drive source. Moreover, the structure is simple and the first slider can be moved to each of the first and second positions by the second slider, which transmits drive force from the drive gear.

Further, a disc drive device of the present invention includes a drive gear rotated by a motor, a loading mechanism, including a loading transmission gear constantly engaging the drive gear, for loading and unloading a disc with drive force transmitted from the loading transmission gear, a pick-up moving mechanism, including a pick-up transmission gear, for moving a pick-up with drive force transmitted to the pick-up transmission gear, an idler gear constantly engaging the drive gear and separably engaging the pick-up transmission gear, a first slider moved between a first position, which is maintained when a disc is not loaded, and a second position, which is maintained when a disc is loaded, to engage the idler gear and the pick-up transmission gear when moved to the second position and to disengage the idler gear and the pick-up transmission gear when moved to the second position, and a second slider for moving the first slider to the second position by transmitting drive force to the first slider located at the first position when loading the disc and moving the first a slider to the first position by transmitting the drive force from the drive gear to the first slider located at the second position when unloading the disc.

In the loading mechanism, drive force is constantly transmitted by the loading transmission gear, which constantly engages the drive gear rotated by a single motor. In the pick-up transmission mechanism, the idler gear, which constantly engages the drive gear, engages and disengages the pick-up transmission gear of the pick-up moving mechanism such that the pick-up transmission gear engages and disengages the idler gear by means of a first slider moving to a first position, which is maintained when a disc is not loaded, and a second position, which is maintained when a disc is loaded. Therefore, since there is no neutral point in the transmission of the drive force at which the drive force is not transmitted to both the loading mechanism and the pick-up moving mechanism, the operational stability is achieved, and separate parts are not required to achieve this operational stability, thereby providing reliable transmission and switching of the drive force from a single drive source. Moreover, the structure is simple and the first slider can be moved to each of the first and second positions by the second slider.

Further, the disc drive device of the present invention includes a slider drive gear rotated when drive force is transmitted from the drive gear. The second slider includes a rack moved together with the first slider and being swingable relative to the first slider, held engaged with the slider drive gear at a position intermediate to the first position and the second position, and separably engaged with the slider drive gear at the first position and the second position. An urging means is provided for urging the second slider in a direction to separate the rack from the slider drive gear.

At the first and second positions, if the second slider swings against the force of the urging means such that the rack engages the slider drive gear, then the first slider is moved together with the second slider, and if the first slider is moved to each of the first and second positions, then the second slider is swung by the force of the urging means and the rack is separated from the slider drive gear such that each of the first and second sliders is stopped.

Further, the disc drive device of the present invention includes a loading side trigger member contacting the disc during loading and swinging the second slider located at the second position to engage the rack with the slider drive gear, and an unloading side trigger member contacting the pick-up side moving toward the center of the disc during unloading and swinging the second slider located at the second position to engage the rack with the slider drive gear.

During loading, the loading side trigger member, which is in contact with the disc, swings the second slider, which is positioned at the first position, to engage the rack and the slider drive gear. During unloading, the unloading side trigger member, which is in contact with the pick-up side moving toward the center of the disc, swings the second slider positioned at the second position, and engages the rack and the slider drive gear.

Further, in the disc drive device of the present invention, the unloading side trigger member stops the pick-up by moving the first slider from the second position and releases the pick-up by moving the first slider to the second position.

Since the unloading side trigger mechanism stops the pick-up by moving the first slider from the second position, positional dislocation of the pick-up is prevented when a disc is not loaded.

Further, the disc drive device of the present invention includes a return restricting means for restricting returning of the first slider from either of the first and second positions.

The return of the first slider which has moved to the first or second position is restricted by the return restricting means, and operational error is prevented.

Further, in the disc drive device of the present invention, the disc loading mechanism ends the loading operation by moving the first slider to the second position and switches to the loading operation state by moving the first slider from the second position.

The loading mechanism stops the loading operation by moving the first slider to the second position and switches to the loading operation by moving the first slider from the second position. Therefore, the switching of the loading operation is reliably accomplished even though drive power is constantly transmitted to the loading mechanism.

Further, in the disc loading device of the present invention, the pick-up moving mechanism includes a transmission cutting means for cutting the transmission of the drive force from the pick-up transmission gear to the pick-up during the time from when the first slider moves from the second position during unloading to when the transmission of the drive force from the idler gear to the pick-up transmission gear is cut.

The pick-up moving mechanism is provided with a transmission cutting means for releasing the transmission of the drive force from the pick-up transmission gear to the pick-up until the transmission of the drive force from the idler gear to the pick-up transmission gear is released by the first slider moving from the second position during unloading. Thus, the unloading operation is permitted.

BRIEF DESCRIPTION OF THE DRAWINGS

FIG. 1 is a partial plan view showing a disc player according to a first embodiment of the present invention when the first slider is at a first position;

FIG. 4 is a perspective view showing a switching mechanism of the disc player in an exploded state;

FIG. 5 includes side views (a), (b), and (c) showing the disc player at various locations when the first slider is at the first position;

FIG. 7 is a plan view showing a pick-up moving mechanism of the disc player;

FIG. 8 is a partial side view showing the first slider of the disc player;

FIG. 9 is a plan view showing the disc loading operation in continuation of FIG. 1;

FIG. 11 is a plan view of the disc player when the first slider is at a second position;

FIG. 14 is a plan view showing the disc unloading operation from the state shown in FIG. 11; and FIG. 15 is a plan view showing the disc unloading operation in continuation from FIG. 14.

BEST MODE FOR CARRYING OUT THE INVENTION

An embodiment of the present invention is described hereinafter with reference to the drawings.

The disc accommodated by the disc player using the disc drive device of the present invention may be, for example, a compact disc for music reproduction, and the example used in the following description is an album-type 12 cm disc.

Figure 2:
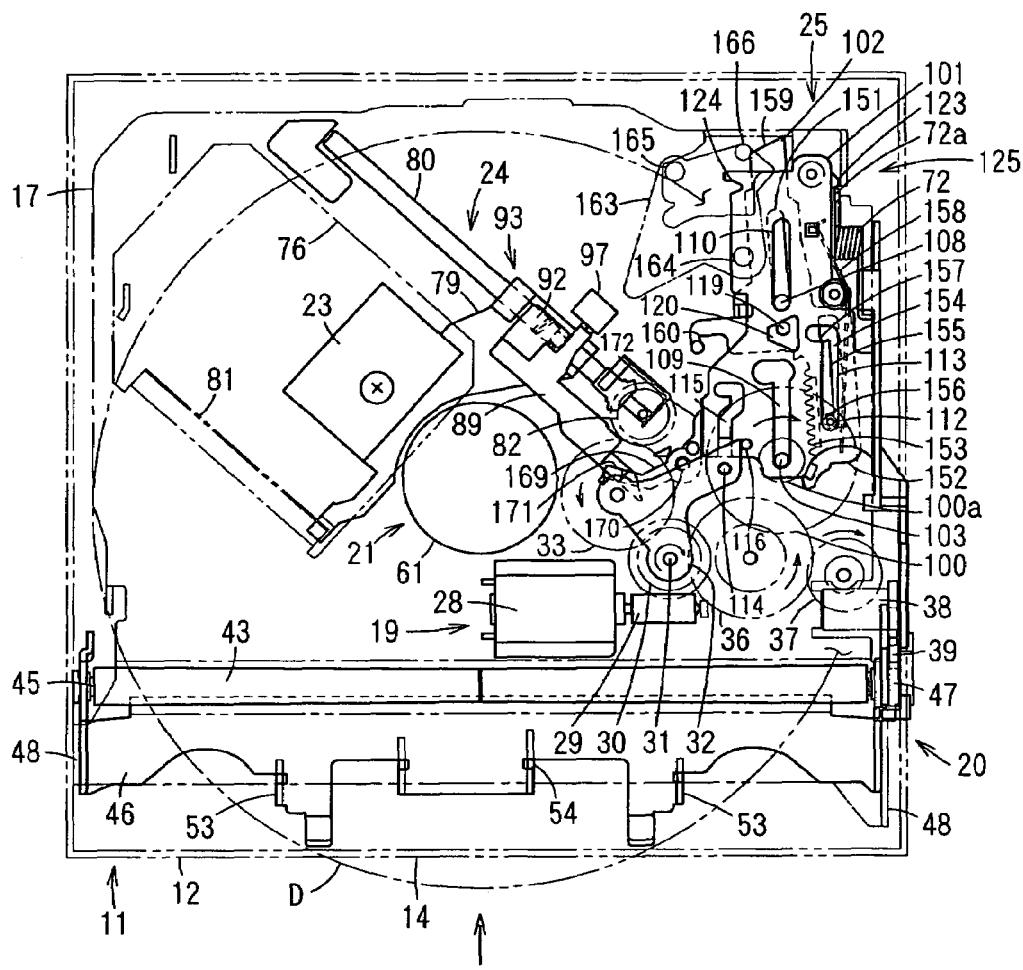
FIG. 2 is a complete plan view showing the disc player when the first slider is at the first position.
Figure 3:
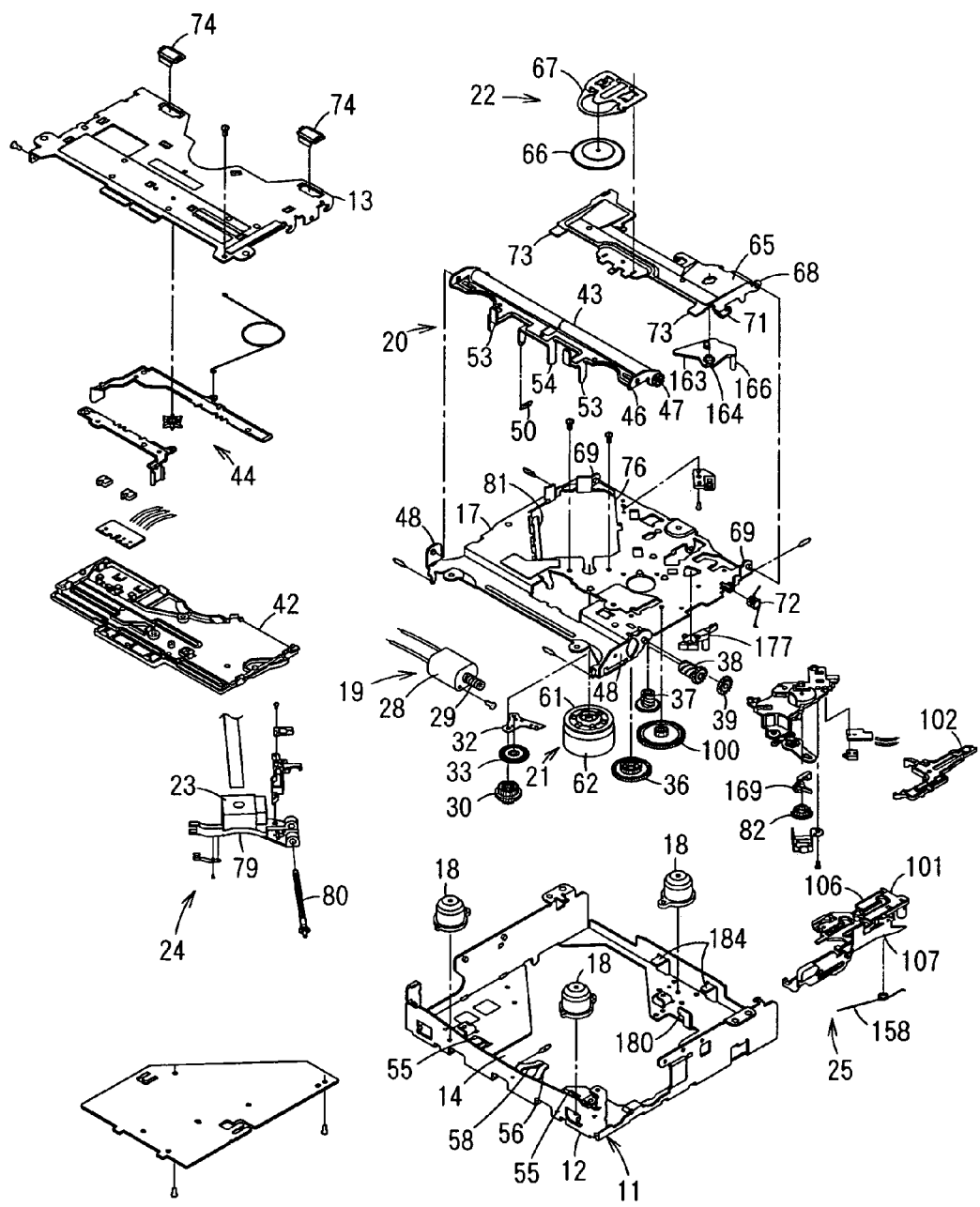
FIG. 3 is a perspective view showing the disc player in an exploded state.

In FIGS. 2 and 3, reference number 11 refers to the body of a disc player. The body 11 has a chassis 12 and a cover 13 mounted on the top surface of the chassis 12. A disc insertion elongated hole 14 is formed on the front side for inserting and removing a disc D in a horizontal orientation. In the following description, the disc insertion elongated hole 14 side of the body 11 in FIG. 2 is referred to as the front, the side opposite that of the disc insertion elongated hole 14 is referred to as the back, and the sides across from the disc insertion elongated hole 14 are referred to as the right side and the left side.

A base 17 is supported in a floating state on the inner side of the chassis 12 by a plurality of dampers 18 and a plurality of suspension springs, which are not shown in the drawing. Arranged on this base 17 are a drive unit 19 for both loading and chucking a disc D, a loading mechanism 20 for loading a disc D and functioning as a transporting means for transporting the disc D with the transmission of power from a drive source, a disc rotation mechanism 21 for rotating the disc D loaded to a reproduction position, which is an retaining position on the base 17, a chuck mechanism 22 for chucking the disc D between itself and the disc rotation mechanism 21, a pick-up 23 for optically reading information recorded on the disc D, a pick-up moving mechanism 24 for moving the pick-up 23 in the radial direction of the disc D and functioning as a moving means for moving the pick-up 23 which reads information from the disc D, and a switching means 25 for switching operations in accordance with the loading and unloading disc D.

The drive unit 19, which is arranged on the front side of the lower surface of the base 17, has a motor 28 functioning as a drive source. A worm gear 29 is mounted on the drive shaft of this motor 28. A drive gear 30 engages the worm gear 29. The drive gear 30 is rotatably supported by a shaft 31 on the lower surface of the base 17. A swing plate 32 is arranged in a swingable manner about the shaft 31 of the drive gear 30. An idler gear 33, which constantly engages the drive gear 30, is rotatably supported on the swing plate 32.

In the loading mechanism 20, a loading transmission gear 36, which constantly engages the drive gear 30, and an intermediate gear 37, which engages the loading transmission gear 36, are rotatably supported on the lower surface of the base 17. A worm gear 38, which engages the intermediate gear 37, and an end gear 39, which engages the worm gear 38, are rotatably supported on the right side of the base 17. Drive force is constantly transmitted to the end gear 39 and produces rotation when the motor 28 is actuated.

A guide plate 42 is arranged at the top side of the disc insertion elongated hole 14. A loading roller 43 is provided on the bottom side for holding and transporting the disc D between itself and the guide plate. The guide plate 42 is mounted on the lower surface of the cover plate 13. A disc positioning mechanism 44 is provided between the cover plate 13 and the guide plate 42 such that a disc D inserted in the disc insertion elongated hole 14 is inserted along the center line in the loading direction. A loading roller 43 is provided on the outer surface of a roller shaft 45. The two ends of the roller shaft 45 are rotatably supported on a loading roller support 46. A gear 47, which is engagable with the end gear 39, is mounted on the right end of the roller shaft 45. The loading roller support 46 is supported so as to be swingable on a shaft 49 (shown in FIGS. 5(b) and (c)) on support members 48 provided on the two front ends of the base 17. The switching operation of the switching mechanism 25 moves the loading roller support 46 to a loading operation position (position indicated in FIGS. 5(b) and (c)), at which the loading roller 43 is raised to a contact position for contacting the disc D and the disc D is held between the loading roller 43 and the guide plate 42 while the gear 47 engages the end gear 39, and a loading operation release position (position indicated in FIGS. 12(b) and (c)), at which the loading roller 43 is lowered to a separation position separated from the disc D and the disc D is released from the loading roller 43 and the guide plate 42 while the gear is disengaged from the end gear 39 to permit reproduction of the disc D. A spring 50 is tensioned between the loading roller support 46 and the base 17. The spring 50 urges the loading roller 43 to the loading position, which is the raised position. The movement of the loading roller support 46 to the loading position occurs when the chucking is released by the chuck mechanism 22, and the movement of the loading roller support 46 to the loading operation release position occurs when the chucking is performed by the chuck mechanism 22.

Near the two ends of the loading roller support 46, a contact 53 extends downward to contact with the side of the chassis 12 when the chucking is released and the loading roller 43 is raised to position of contact with the disc D. Further, a guide 54 protrudes to engage the side of the chassis 12 and functions as a first positioning portion for stopping and positioning the base 17 relative to the chassis 12 side in a direction parallel to the disc surface.

Figure 6:
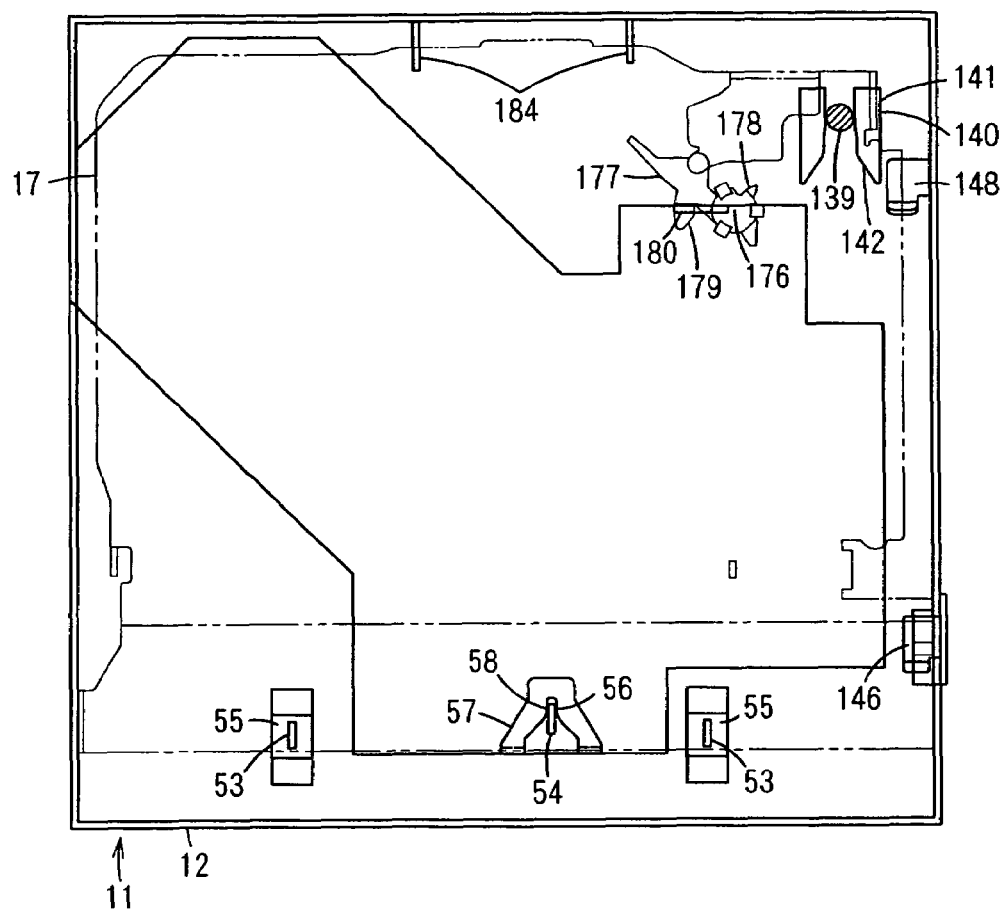
FIG. 6 is a plan view showing a chassis of the disc player when the first slider is at the first position.

As shown in FIG. 5(c) and FIG. 6, a peak-shaped receiver 55 is formed on the chassis 12 and abuts each contact 53 when the chucking is released at each position of the contacts 53 on the two sides of the loading roller support 46. As shown in FIG. 5(b) and FIG. 6, a first linking portion 56 is provided on the chassis 12 for stopping and positioning the base 17 relative to the chassis 12 in a direction parallel to the disc surface. The first linking portion 56 has an L-shaped linking piece 57, which rises from the base plate of the chassis 12 and is bent backward. A lock groove 58 is formed on the front end of the linking piece 57 for engaging the guide 54. The front side of the lock groove 58 becomes wider toward the front.

As shown in FIG. 3, the disc rotation mechanism 21 has a turntable 61 on which is removably installed the center hole of the disc D loaded at the reproduction position of the base 17, such that this turntable 61 is rotated by a spindle motor 62 mounted on the underside of the base 17.

As shown in FIG. 3 and FIG. 5(a), the chuck mechanism 22 has a chuck arm 65, which functions as a chucking body arranged on the back side on the base 17, and a clamp 66 for chucking the disc D between the clamp 66 and the turntable 61 is rotatably mounted at the center of the front end of the chuck arm 65 by a clamp fixture 67. Bent mounting pieces 68 are formed on the two sides of the chuck arm 65, and the two mounting pieces 68 are rotatably supported by a support shaft 70 on the support 69 on the two back sides of the base 17. The front end of the chuck arm 65 swings downward to chuck the disc D during chucking, and the front end of the chuck arm 65 swings upward and to unchuck the disc D when releasing the chucking.

A receiver 71 is formed on the mounting piece 68 on the right side of the chuck arm 65, and one end of a spring 72 attached to the base 17 is connected to the receiver 71. The spring 72 urges the front end of the chuck arm 65 downward in the chucking direction.

Contacts 73 protrude at positions near the two front end of the chuck arm 65 so as to press against the cover 13 when the front end of the chuck arm 65 is swung upward and unchucked. Synthetic resin receivers 74 are attached at a position abutting each contact 73 on the cover plate 13.

As shown in FIGS. 2 and 3, the pick-up 23 moves, by means of the pick-up moving mechanism 24, in the radial direction of the disc D opposite the surface of the disc D on which is recorded information, and reads the information recorded on the rotating disc D through an aperture 76 provided in the base 17.

As shown in FIGS. 2, 3, and 7, the pick-up moving mechanism 24 has a pick-up moving platform 79 on which is installed the pick-up 23, and the pick-up moving platform 79 is supported so as to be movable in the inner circumference direction or outer circumference direction of the disc D by a feed shaft 80 arranged so as to be rotatable on one side of the aperture 76 of the base 17 and along a guide edge 81 formed in the other side thereof.

A rotatable pick-up transmission gear 82 separably contacting the idler gear 33 is arranged on one end of the feed shaft 80. A bevel gear 84 attached to the feed shaft 80 engages a bevel gear 83 attached to the pick-up transmission gear 82.

Both ends of the feed shaft 80 are rotatably supported on the base 17, and the shaft is provided with a spiral threaded portion 85. One end of the threaded portion 85 has a small diameter portion 86, which is smaller than the threaded portion 85 in the moving direction toward the inner circumference direction of the pick-up moving platform 79.

A pick guide 89 is attached to the pick-up moving platform 79 so as to confront the feed shaft 80. A first tooth portion 90 is formed on the pick guide 89 so as to engage the threaded portion 85 of the feed shaft 80. A belleville spring 92 is attached to the second tooth portion 91, which engages the threaded portion 85 of the feed shaft 80. The pick-up moving platform 79 is moved in the inner circumference direction or the outer circumference direction by the engagement of the threaded portion 85 and the first tooth portion 90 and the second tooth portion 91 via the rotation of the feed shaft 80. When the pick-up moving platform 79 moves to the innermost position, the movement of the pick-up moving platform 79 is restricted at the innermost position, the first tooth portion 90 enters the small diameter portion 86 and the engagement is released, and the second tooth portion 91 is disengaged by the elasticity of the belleville spring 92 such that the drive force transmission is cut. That is, a transmission cutting means 93 cuts the transmission of the drive force from the pick-up transmission gear 82 to the pick-up 23.

A stopper 95 protrudes from the endface 94 of the pick guide 89, and a stop groove 96 is formed on the top surface of the stopper 95.

A switch 97 is provided on the top of the base 17 for detecting that the pick-up moving platform 79 has moved to the inner circumference position.

As shown in FIGS. 1 through 4, the switching mechanism 25 has a slider drive gear 100 for transmitting the drive force of the motor 28, and a first slider 101 and second slider 102, which functions as loading members for transmitting the drive force from the slider drive gear 100. The first slider 101 of the switching mechanism 25 holds a first position until the disc D reaches the reproduction position by means of the loading mechanism 20, and when the disc D has arrived at the reproduction position, the first slider 101 is moved toward the second position. During the process of moving toward the second position, the first slider 101 blocks the drive force to the loading mechanism 20 and is constructed as a drive force switching means to transmit the drive force to the pick-up moving mechanism 24.

The slider drive gear 100 is rotatably supported by a pin 103 protruding from the base 17 and engages the intermediate gear 37.

The first slider 101 has an integrated slider base 106, which is arranged on the lower surface of the base 17, and slider side portion 107, which is arranged on the right side surface of the base 17. The slider base 106 and the slider side portion 107 are arranged to be movable in forward-and-back directions corresponding to the loading direction. A back position is designated as a first position corresponding to an unloading end position or unloading standby position (position shown in FIGS. 1 and 2), and a front position is designated as a second position corresponding to a disc reproduction position, loading end position, or unloading start position (position shown in FIG. 11).

On the front and back parts of the slider base 106 of the first slider 101, elongated holes 109 and 110 are formed extending in the forward-and-back direction to receive the front and back pins 103 and 108 provided in the base 17 so as to guide the movement of the first slider 101 in the forward-and-back direction.

On the right side of the elongated hole 109 on the front side of the slider base 106, an insertion groove 113, in which a pin 112 of the base 17 is inserted, extends in the forward-and-back direction. On the left side of the elongated hole 109, a cam groove 115 capable of engaging a cam pin 114 of a swing plate 32 is formed, and a projection 116 capable of engaging the swing plate 32 is formed on the right side of the cam groove 115. The cam groove 115 is open on the front end and the front portion is linear in a front-to-back direction, whereas the back portion is inclined to the right side. When the first slider 101 is positioned at the back side first position, the cam pin 114 of the swing plate 32 is separated from the cam groove 115 to the front. However, the swing plate 32 engages the projection 116 to hold the idler gear 33 in a state separated from the pick-up transmission gear 82. In the movement range in which the first slider 101 moves from the back side first position to just before the front side second position, the straight portion of the cam groove 115 moves while engaged with the cam pin 114, and the idler gear 33 is held separated from the pick-up transmission gear 82. The right side inclined portion of the cam groove 115 engages the cam pin 114 when the first slider 101 is moved to the front side second position, and the swing plate 32 is rotated to engage the idler gear 33 with the pick-up transmission gear 82.

In the center of the slider base 106, a trapezoidal connector hole 120, which engages a connecting pin 119 projecting from the second slider 102, is formed.

On the right side back end of the slider base 106, a projection 123, which engages the end 72a of the other end of the spring 72, is formed. On the left side back end, a notch 124 is formed. The end 72a of the spring 72 is L-shaped, and the end 72a of the spring 72 engages the front side of the projection 123 when the first slider 101 is at the first position to restrict the return of the first slider 101 in the forward direction, as shown in FIG. 5(a). That is, a return restricting mechanism 125 is constructed for restricting the return of the first slider 101 from the first position to the second position by means of the projection 123 and the spring 72.

On the front side of the slider side portion 107, an elongated hole 128 is formed in the front-to-back direction for engaging the end of the shaft of the worm gear 38, and a cam groove 129 is formed for engaging one end of the roller shaft 45. As shown in FIG. 8, the cam groove 129 has a loading groove portion 130 for maintaining a loading position at which the gear 47 engages the end gear 39 and the loading roller 43 is raised by the movement of the first slider 101 to the first position, an unloading groove portion 131 for maintaining a loading operation release position at which the gear 47 is separated from the end gear 39 and the loading roller 43 is lowered by the movement of the first slider 101 to the second position, and an inclined groove portion 132 medial to the loading groove portion 130 and the unloading groove portion 131. A projection 133 is formed at the entrance to the unloading groove portion 131, such that after the first slider 101 is moved to the second position and the unloading groove portion 131 has engaged the roller shaft 45, the back side return of the first slider 101 is restricted. That is, a return restricting mechanism 125 is constructed for restricting the return of the first slider 101 from the second position to the first position by means of the roller shaft 45 and the projection 133.

On the back side of the slider side portion 107, a chuck operating portion 136 is formed to release the chuck by raising the receiver 71 of the chuck arm 65 at the first position of the first slider 101 and separating the first slider 101 from the receiver 71 by moving the first slider 101 to the second position, as shown in FIG. 5(a).

Furthermore, as shown in FIGS. 4 and 5(b), a guide 139, functioning as a second positioning portion, is formed at the back of the slider base 106 of the first slider 101. As shown in FIG. 5(b) and FIG. 6, a second connector 140 is provided on the chassis 12 for engaging the guide 139 when the slider 101 is moved to the first position and positioning the base 17 relative to the chassis 12 in a direction parallel to the disc surface. The second connector 140 has an L-shaped connector piece 141, which rises from the base plate of the chassis 12 and is bent to the front, and a lock groove 142 is formed on the front end of the connector piece 141 for engaging the guide 139. The front end of the lock groove 142 is open toward the front.

As shown in FIG. 4 and FIG. 5(b), on the back side and top and bottom portions of the front side of the slider side 107, contacts 143, 144, and 145 are formed for contacting the chassis 12 when the first slider 101 is moved to the first position. On the chassis 12, unilateral connectors 146, 147, and 148 are formed for engaging each of the contacts 143, 144, and 145 of the first slider 101 and positioning the base 17 relative to the chassis 12 in a direction perpendicular to the disc surface when the first slider 101 is moved to the first position. The contact 143 is positioned in contact with the top surface of the unilateral connector 146, the contact 144 is positioned in contact with the lower surface of the unilateral contact 147, and the contact 145 is positioned in contact with the lower surface of the unilateral connector 148.

As shown in FIGS. 1, 2, and 4, on the second slider 102, an elongated hole 151 is formed in the front-to-back direction for engaging a pin 108 of the base 17. The second slider 102 is movably connected to the first slider 101 in a range in which the connecting pin 119 moves in the connector hole 120 of the slider 101 in the front-to-back direction and the swinging direction about the pin 108, and moves to the first position and second position together with the first slider 101.

On the front end of the second slider 102, a lever 152 is formed on the right side of the slider drive gear 100, and on the lever 152, a rack 153 which is capable of engaging a gear 100a of the slider drive gear 100 is formed.

On the lever 152, a cam groove 154 is formed for engaging a pin 112 of the base 17. The cam groove 154 has a restricting portion 155, extending in the front-to-back direction, and a first stopper portion 156 and a second stopper portion 157 which become wider on the left side at the rack 153 at the front and back ends of the restricting portion 155. At the first position or the second position of the second slider 102, the pin 112 engages the first stopper portion 156 or the second stopper portion 157, such that the second slider 102 is allowed to swing and the rack 153 engages or disengages the gear 100a of the slider drive gear 100, and at an intermediate position between the first position and second position of the second slider 102, the pin 112 engages the restricting groove 155, such that the swinging of the second slider 102 is restricted and the rack 153 is maintained in a state of engagement with the gear 100a of the slider drive gear 100.

A spring 158 is mounted on the first slider 101 as an urging means for urging the second slider 102 in a direction to separate the rack 153 from the gear 100a of the slider drive gear 100.

A connector piece 159 projects from the back end of the second slider 102, and a connector piece 160 projects from the left side of the second slider 102 facing the pick-up moving mechanism 24.

As shown in FIGS. 1 through 3, during loading, a loading side trigger member 163 is provided to swing the second slider 102 when it is in contact with the disc D at the first position so that the rack 153 engages the slider drive gear 100. The loading side trigger member 163 is supported so as to be rotatable and pivot on a fulcrum 164 of the chuck arm 65, and is provided with a disc contact 165 for contacting the disc D, and a contact 166 for contacting the connector piece 159 of the second slider 102.

Furthermore, as shown in FIGS. 1 through 4 and FIG. 7, during unloading, an unloading side trigger member 169 is provided to swing the second slider 102 at the second position when it is in contact with the pick-up 23 side and moving toward the center of the disc D, such that the rack 153 engages the slider drive gear 100. The unloading side trigger member 169 is L-shaped and the center portion is supported so as to rotatable by a support shaft 170 on the base 17 side. On one end, a contact 171 capable of making contact with the endface 94 of the pick guide 89 is formed. On the other end, a contact 172 capable of making contact with the connector piece 160 of the second slider 102 is formed. On the connector 171, a projection 173 capable of engaging the stop groove 96 of the pick guide 89 is formed.

Figure 10:
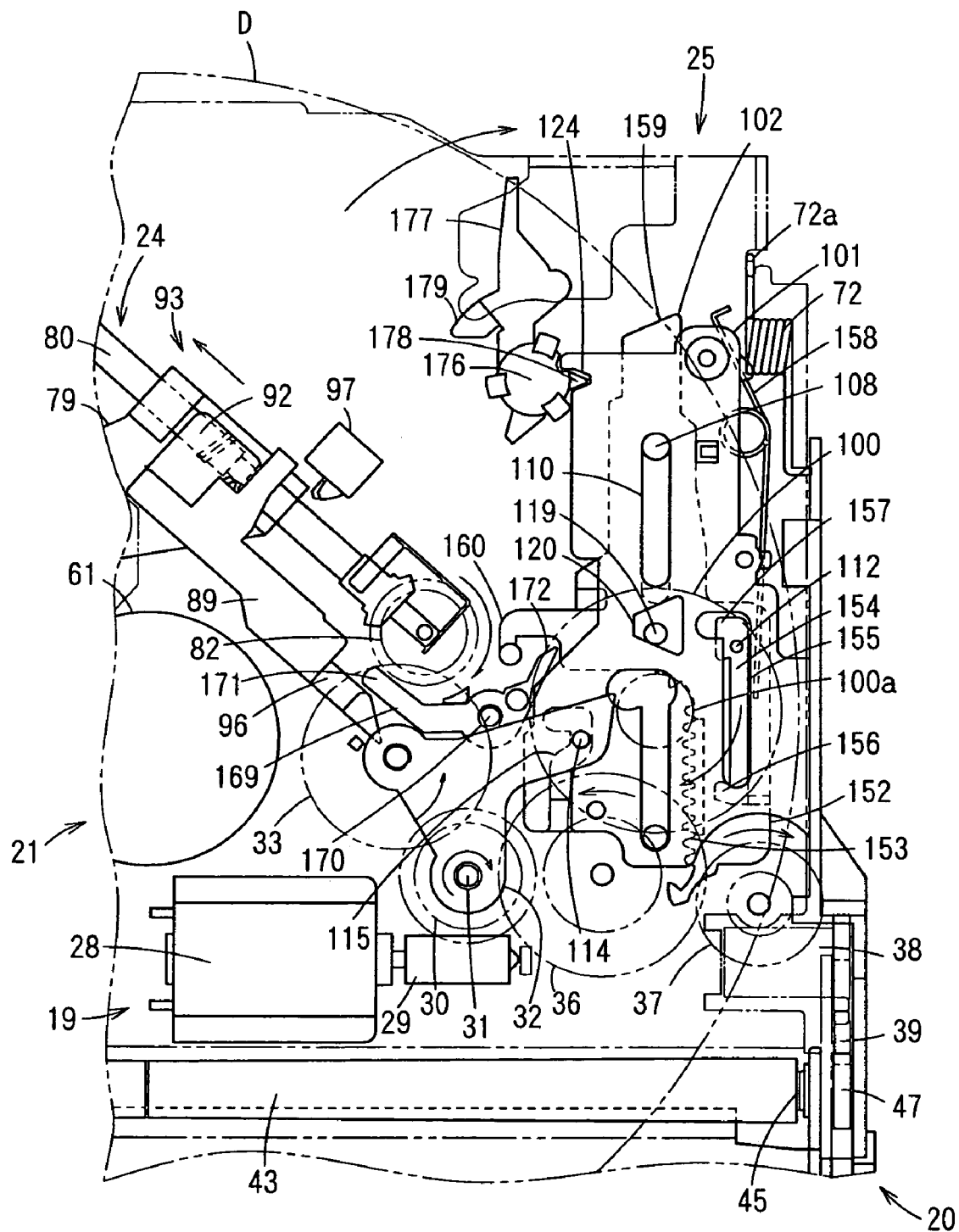
FIG. 10 is a plan view showing the disc loading operation in continuation of FIG. 9.

As shown in FIGS. 4, 5(c), and 10, a connector 177, which is capable of pivoting on the fulcrum 176, is mounted on the base 17 on the left side of the back end of the first slider 101.

On the connector 177, a projection 178 which is capable of engaging the notch 124 of the first slider 101 is formed so that when the first slider 101 is moved to the first position, it is rotated in a counterclockwise direction in FIG. 10, and when moved to the second position it is rotated in a clockwise direction in FIG. 10. On the lower surface of the connector 177, an L-shaped stopper 179 capable of engaging the base 17 side when the first slider 101 is moved to the first position is formed. As shown in FIGS. 3, 5(c), and 6, an L-shaped stopper piece 180 projects from the chassis 12 for engaging the stopper 179 of the connector 177 and positioning the base 17 relative to the chassis 12 in a direction perpendicular to the disc surface when the first slider 101 is moved to the first position.

As shown in FIGS. 3, 5(c), and 6, a bent contact 183 is formed on the back of the base 17, and a receiver 184 is formed on the chassis 12 so as to contact the contact 183 when the chuck is released and the chuck arm 65 contacts the cover 13 and presses the base 17 downward.

The operation of the disc player will now be described.

FIGS. 1, 2, 5, and 6 illustrate the player when a disc is not loaded. Although FIGS. 1 and 2 show a disc D in the process of being loaded, the position of each mechanism is the same as prior to the loading of the disc D.

The sliders 101 and 102 are set at the back side first position, and the first stop groove 156, which is provided on the front end of the cam groove 154 of the second slider 102, engages the pin 112, and the rack 153 is removed to the rightward direction of the slider drive gear 100. The swing plate 32 engages the projection 116 of the first slider 101, and the idler gear 33 is separated from the pick-up transmission gear 82.

The contact 172 of the unloading side trigger member 169 engages the left side surface of the first slider 101, and the projection 173 of the unloading side trigger member 169 engages the stop groove 96 of the pick guide 89 so as to lock the pick-up moving platform 79.

As shown in FIG. 5, the roller shaft 45 of the loading roller 43 is raised by the cam groove 129 of the first slider 101 such that the disc D is held between the loading roller 43 and the guide plate 42, and the gear 47 engages the end gear 39. Furthermore, the chuck arm 65 is raised by the chuck operating portion 136 of the first slider 101 to the chuck release position.

As shown in FIGS. 5 and 6, each contact 53 of the loading roller support 46 contacts the top surface of the receiver 55 of the chassis 12, the contacts 73 of the chuck arm 65 contact the lower surface of the receiver 74 of the cover 13 and the base 17 is pressed downward relative to the chassis 12, the contact 183 of the base 17 contacts the receiver 184 of the chassis 12, the contacts 143, 144, and 145 of the slider side 107 of the first slider 101 contact the unilateral connectors 146, 147, and 148 on one side of the chassis 12, the stopper 179 of the connector 177 engages the stop piece 180 of the chassis 12, and the base 17 is set relative to the chassis 12 at a position in a direction perpendicular to the disc surface. The guide 54 of the loading roller support 46 engages the first linking portion 56, the guide 139 of the first slider 101 engages the second connector 140 of the chassis 12, and the base 17 is set relative to the chassis 12 in a direction parallel to the disc surface. Accordingly, the base 17, which is supported in a floating state, is in a floating state fixed relative to the chassis 12.

The operation for loading the disc D will now be described.

When a disc D is inserted into the disc insertion elongated hole 14, the insertion of the disc D is detected by a special insertion detection switch, and the motor 28 rotates in the loading direction. When the motor 28 rotates in the loading direction, the drive gear 30 is rotated in a clockwise direction in FIGS. 1 and 2, and the drive force from the drive gear 30 is transmitted to the loading roller 43 through the loading transmission gear 36, the intermediate gear 37, the worm gear 38, the end gear 39, and the gear 47, such that the loading roller 43 is rotated in the loading direction.

When the leading end of the disc D is inserted into the disc insertion elongated hole 14 and held between the guide plate 42 and the loading roller 43, the disc D starts to be transported toward the reproduction position within the body 11 by the loading roller 43.

While the disc D is being transported to the reproduction position, only the loading mechanism operates and the other mechanisms are maintained in the initial state. That is, although the drive gear 30 is rotated by the drive motor 28, the idler gear 33 and slider drive gear 100 only idle, and the drive force is not transmitted to the separated pick-up transmission gear 82 and sliders 101 and 102.

Then, when the disc D reaches the reproduction position, as shown in FIG. 9, the leading edge of the disc D in the loading direction contacts the disc contact 165 of the loading side trigger member 163, and the loading side trigger member 163 rotates on the fulcrum 164 in a clockwise direction in FIG. 9, and the second slider 102 is swung on the pin 108 in the clockwise direction in FIG. 9 against the force of the spring 158 by the contact 166 of the loading side trigger member 163.

When the second slider 102 swings in the clockwise direction in FIG. 9, the first stop groove 156, which is provided on the front end of the cam groove 154 of the second slider 102, is removed from the pin 112, and the rack 153 engages the gear 100a of the slider drive gear 100, and the second slider 102 moves toward the front side second position. When the movement of the second slider 102 begins, the restricting groove 155 of the cam groove 154 engages the pin 112, and the swinging of the second slider 102 is restricted, and the rack 153 is maintained in a state of engagement with the slider drive gear 100.

The movement of the second slider 102 brings the connecting pin 119 of the second slider 102 into contact with the connector hole 120 of the first slider 101, and the first slider 101, linked to the second slider 102, starts to move to the front side second position.

Figure 12:
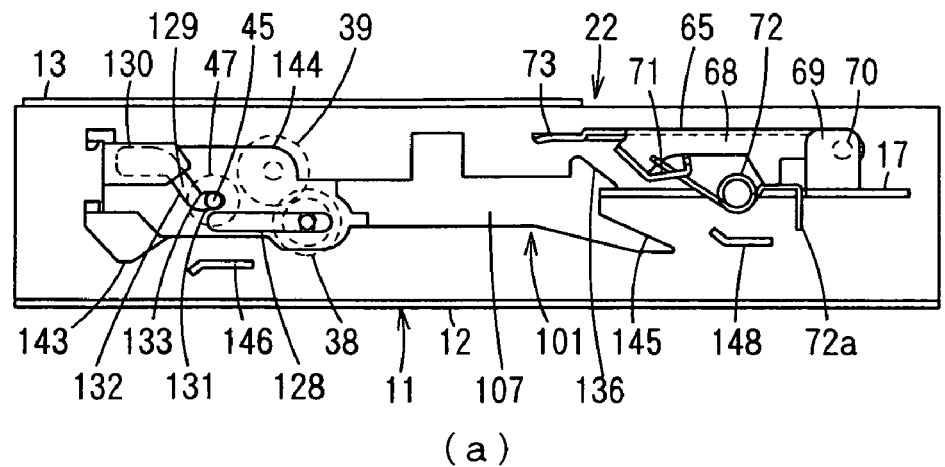
FIG. 12 includes side views (a), (b), and (c) showing the disc player at various locations when the first slider is at the second position.
Figure 12:
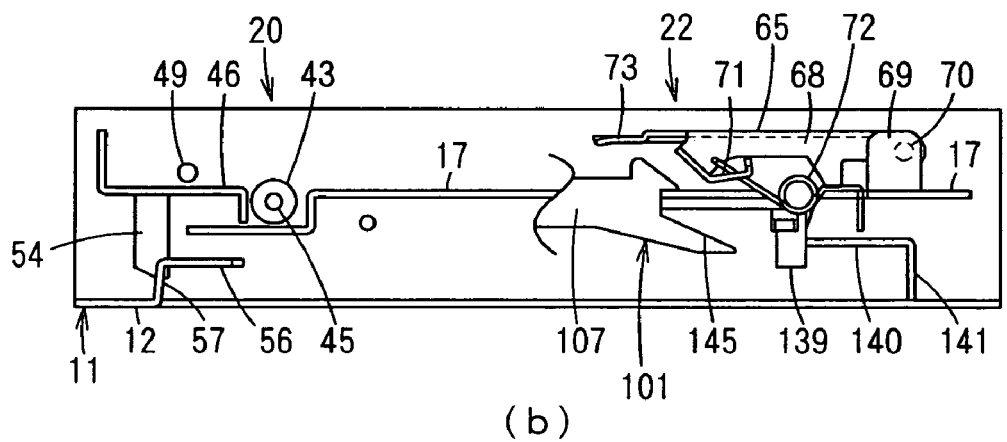
Figure 12:
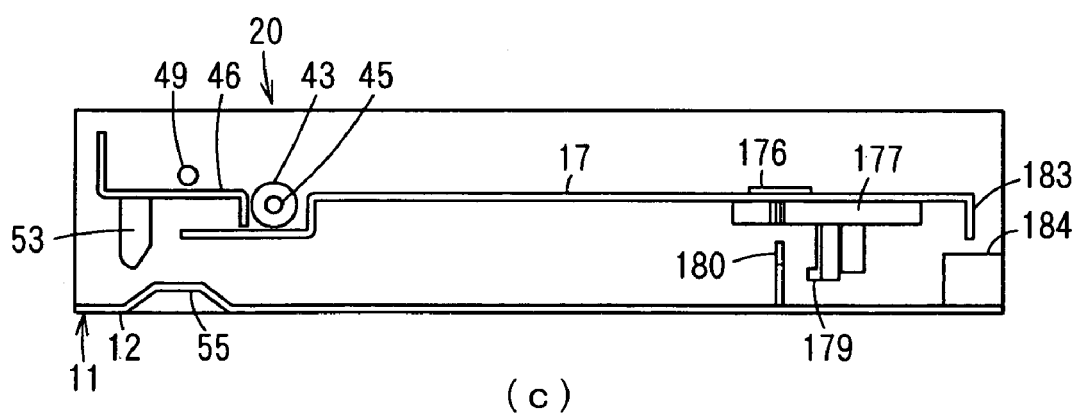

As shown in FIG. 12, the movement of the first slider 101 causes the loading shaft 45 of the loading roller 43 to be pushed downward by the cam groove 129 of the first slider 101, such that the loading roller 43 is separated from the disc D and the gear 47 is separated from the end gear 39, such that the loading roller 43 stops rotating. Furthermore, the chuck arm 65 releases the lift provided by the chuck operating portion 136 of the first slider 101 relative to the receiver 71, and is lowered by the force of the spring 72, so as to chuck the disc D between the clamp 66 and turntable 61.

Figure 13:
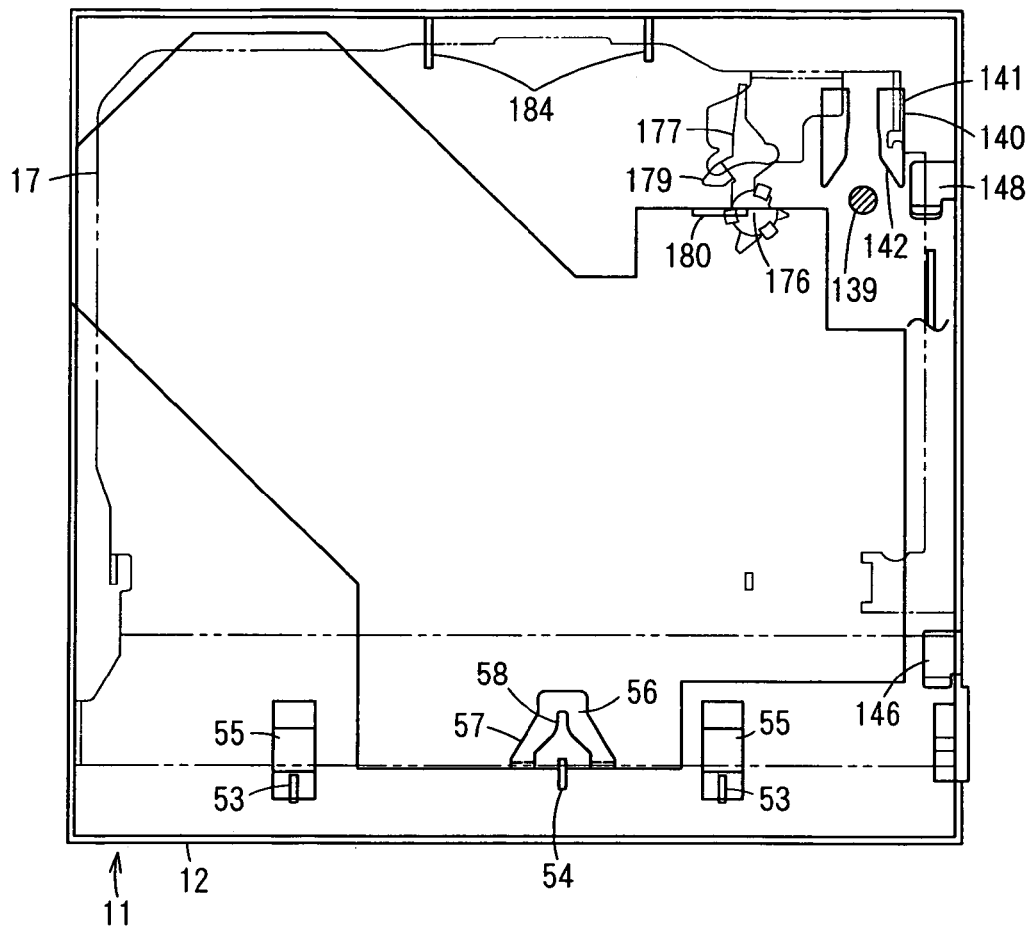
FIG. 13 is a plan view showing the chassis of the disc player when the first slider is at the second position.

As shown in FIGS. 12 and 13, the contacts 53 of the loading roller support 46 are separated from receivers 55 of the chassis 12, the contacts 73 of the chuck arm 65 are separated from the receiver 74 of the cover 13, the pressing of the base 17 on the chassis 12 is released, the contacts 183 of the base 17 separate from the receivers 184 of the chassis 12, the contacts 143, 144, and 145 of the slider side 107 of the first slider 101 separate from the unilateral connectors 146, 147, and 148 on one side of the chassis 12, the stopper 179 of the connector 177 separates from the stop piece 180 of the chassis 12, and the base 17 is released from the position in a direction perpendicular to the disc surface relative to the chassis 12. Furthermore, the guide 54 of the loading roller support 46 is separated from the first linking portion 56 of the chassis 12, and the guide 139 of the first slider 101 is separated from the second connector 140 of the chassis 12, such that the base 17 is released from the position in a direction parallel to the disc surface relative to the chassis 12. Accordingly, the floating lock, which fixes the base 17 relative to the chassis 12, is released, and the base 17 is supported in a floating state relative to the chassis 12.

Furthermore, as shown in FIG. 10, if each slider 101 and 102 is moved to the second position, the second stop groove 157 provided on the back end of the cam groove 154 of the second slider 102 reaches the position of the pin 112, and, as shown in FIG. 11, the force of the spring 158 swings the second slider 102 about the pin 108 in a counterclockwise direction in FIG. 11, the second stop groove 157 engages the pin 112, and the rack 153 is removed to the right from the slider drive gear 100. Accordingly, the movement of each slider 101 and 102 stops at the second position.

As shown in FIGS. 8 and 12(*a*), the first slider 101 is moved to the second position, the loading release groove 131 engages the roller shaft 45, and the roller shaft 45 is stopped by the projection 133 provided at the entrance of the unloading groove 131, such that the return of the first slider 101 from the second position to the first position is restricted.

Furthermore, as shown in FIGS. 10 and 11, when the first slider 101 is moved to the front side second position, the connector piece 160 of the second slider 102 engages the contact 172 of the unloading side trigger member 169, and the unloading side trigger member 169 is rotated in the clockwise direction in FIG. 10, such that the projection 173 is removed from the stop groove 96 of the pick-up moving platform 79 to release the lock of the pick-up moving platform 79.

The swing plate 32 is rotated in the clockwise direction in FIG. 10 by the cam groove 115 of the first slider 101, and the idler gear 33 engages the pick-up transmission gear 82 and the pick-up transmission gear 82 is rotated.

The drive force transmitted to the pick-up transmission gear 82 is then transmitted to the feed shaft 80, and the feed shaft 80 is rotated. When the feed shaft 80 rotates, the pick-up moving platform 79 is moved in the outer circumference direction via the engagement of the threaded portion 85 of the feed shaft 80 and the second tooth portion 91 of the belleville spring 92, then the first tooth portion 90 of the pick guide 89 engages the threaded portion 85 via the movement of the pick-up moving platform 79 in the outer circumference direction to obtain an actual state of engagement.

Furthermore, as shown in FIG. 11, after the movement of the sliders 101 and 102 has stopped when the sliders 101 and 102 are at the second position, the motor 28 reversely rotates, and the pick-up moving platform 79, which has moved to the outer circumference side, is returned to the reproduction position on the inner circumference side. At the moment the pick-up moving platform 79 moves to the outer circumference side, the switch 97 is switched and the spindle motor 62 rotates, and the TOC information recorded at the innermost circumference of the data recording region of the disc D is read by the pick-up 23 which has returned to the inner circumference side reproduction position to enable the reproduction of the disc D.

During the disc D reproduction operation, the sliders 101 and 102 are held at the front side second position, the rack 153 of the second slider 102 disengages and is separated from the slider drive gear 100, and the idler gear 33 is held in the engaged state with the pick-up transmission gear 82, such that the drive force of the motor 28 is transmitted only to the pick-up moving mechanism 24. Therefore, when the motor 28 drives in the forward or reverse rotation, the pick-up 23 is moved in the inner circumference direction or the outer circumference direction of the disc D.

The disc D unloading operation will now be described.

During unloading, the motor 28 rotates in the unloading direction which is opposite the loading direction, and the pick-up moving platform 79 is moved to the innermost circumference position, as shown in FIG. 11.

As shown in FIG. 14, when the pick-up moving platform 79 moves to the innermost circumference position, the endface 94 of the pick guide 89 contacts the contact 171 of the unloading side trigger member 169, and the unloading side trigger member 169 is rotated on the support shaft 170 in a counterclockwise direction in FIG. 14.

The contact 172 of the unloading side trigger member 169 engages the connector piece 160 of the second slider 102, and the second slider 102 swings on the pin 108 in a clockwise direction in FIG. 14 against the force of the spring 158.

When the second slider 102 swings in the clockwise direction in FIG. 14, the second stop groove 157 provided on the back end of the cam groove 154 of the second slider 102 is removed from the pin 112, and the rack 153 engages the gear 100a of the slider transmission gear 100, such that the second slider 102 is moved toward to the back side first position. When the movement of the second slider 102 starts, the restricting groove 155 of the cam groove 154 engages the pin 112, such that the swinging of the second slider 102 is restricted and the rack 153 is held in a state of engagement with the slider drive gear 100.

When the second slider 102 moves, the connecting pin 119 of the second slider 102 contacts the back edge of the connector hole 120 of the first slider 101, and the first slider 101 linked to the second slider 102 starts to move to the back side first position.

When the first slider 101 moves, the chuck arm 65 releases the chuck of the disc D with the receiver 71 raised by the chuck operating portion 136 of the first slider 101, as shown in FIG. 5. Furthermore, the roller shaft 45 of the loading roller 43 is raised by the cam groove 129 of the first slider 101, and the disc D is held between the loading roller 43 and the guide plate 42 and the gear 47 engages the end gear 39, such that the disc D is transported forward in the unloading direction.

As shown in FIGS. 5 and 6, each contact 53 of the loading roller support 46 contacts the top surface of the receivers 55, the contact 73 of the chuck arm 65 contacts the lower surface of the receiver 74 of the cover 13, and the base 17 is pressed downward relative to the chassis 12, the contacts 183 of the base 17 contacts the receivers 184 of the chassis 12, and the contacts 143, 144, and 145 of the slider side 107 of the first slider 101 contact the unilateral connectors 146, 147, and 148 on one side of the chassis 12, the stopper 179 of the connector 177 engages the stop piece 180 of the chassis 12, and the base 17 is positioned in a direction perpendicular to the surface of the disc D relative to the chassis 12. Then, the guide 54 of the loading roller support 46 engages the first linking 56 of the shaft 12 and the guide 139 of the first slider 101 engages the second connector 140 of the chassis 12, such that the base 17 is positioned in a direction parallel to the surface of the disc D relative to the chassis 12. Accordingly, the base 17, which is supported in a floating state, is set in a floating state fixed relative to the chassis 12.

In FIG. 14, when the first slider 101 moves to the back side from the front side second position, the spring plate 32 is rotated in a counterclockwise direction in FIG. 14 by the cam groove 115 of the first slider 101, and the idler gear 33 is separated from the pick-up transmission gear 82, such that the transmission of the drive force to the pick-up moving mechanism 24 is cut.

Since the drive force from the motor 28 continues to be transmitted to the pick-up moving mechanism 24 until the transmission of the drive force to the pick-up moving mechanism 24 is cut, the rotation of the feed shaft 80 is continuous even though the pick-up moving platform 79 reaches the innermost circumference position and movement is restricted. As shown in FIG. 7, when the pick-up moving platform 79 has moved to the innermost circumference position, the first tooth portion 90 enters the small diameter portion 86 and the engagement is released, and the second tooth portion 91 disengages by means of the flexibility of the belleville spring 92 and the transmission of the drive force is cut.

As shown in FIG. 15, if the sliders 101 and 102 are moved to the first position, the first stop groove 156 provided on the front end of the cam groove 154 of the second slider 102 reaches the position of the pin 112, the second slider 102 is swung on the pin 108 in a counterclockwise direction in FIG. 15 by the force of the spring 158, the first stop groove 156 engages the pin 112, and the rack 153 is removed to the right from the slider drive gear 100. Accordingly, the movement of the first and second sliders 101 and 102 is stopped at the second position.

The motor 28 is stopped at the moment the front edge of the disc D in the unloading direction protrudes by a predetermined measurement from the disc insertion elongated hole 14.

As described above, drive force is constantly transmitted to the loading mechanism 20 by the loading transmission gear 36, which constantly engages a drive gear 30 driven by a single motor 28. The pick-up moving mechanism 24 is constructed to separably connect the idler gear 33, which constantly engages the drive gear 30, to the pick-up transmission gear 82 of the pick-up moving mechanism 24. The idler gear 33 engages and disengages the pick-up transmission gear 82 by means of the first slider 101 moving to a first position when a disc D is not loaded and a second position when a disc D is loaded. Thus, since there is no neutral point in the transmission of the drive force at which the drive force is not transmitted to both the loading mechanism 20 and the pick-up moving mechanism 24, operational stability is achieved, and separate parts are not required to stabilize their operation, such that the transmission and switching of a drive force from a single motor can be reliably accomplished. Moreover, the first slider 101 is moved to the first and second positions by the second slider 102 which receives the drive force from the drive gear 30, thereby providing a simple construction.

At each of the first and second positions, if the second slider 102 is swung against the force of the spring 158 and the rack 153 engages the slider drive gear 100, the first slider 101 moves together with the second slider 102, and if the first slider 101 moves to each of the first and second positions, the second slider 102 is swung by the force of the spring 158 such that the rack 153 is removed from the slider drive gear 100, and the first and second sliders 101 and 102 are stopped.

Furthermore, during loading, the second slider 102, which is set at the first position, is swung by means of the loading side trigger member 163, which is in contact with the disc D, and the rack 153 is engaged with the slider drive gear 100 by means of the second slider 102. During unloading, the second slider 102, which is set at the second position, is swung to engage the rack 153 and the slider drive gear 100 by means of the unloading side trigger member 169, which is in contact with the pick-up 23 side moving toward the center of the disc D.

Since the unloading side trigger member 169 stops the pick-up 23 side by the first slider 101 moving from the second position, positional dislocation of the pick-up 23 is prevented when a disc D is not loaded.

In addition, the return restricting means 125 restricts the return of the first slider 101 moving to the first and second positions so as to prevent erroneous operation.

In the loading mechanism 20, the loading operation is ended by the movement of the first slider 101 to the second position, and since the loading operation condition is switched by the movement of the first slider 101 from the second position, the loading operation is reliably switched even when drive force is constantly transmitted to the loading mechanism 20.

Furthermore, in the pick-up moving mechanism 24, the unloading operation is allowed because the transmission cutting means 93 is provided for cutting the transmission of the drive force from the pick-up transmission gear 82 to the pick-up 23 until the transmission of the drive force is cut from the idler gear 33 to the pick-up transmission gear 82 by the movement of the first slider 101 from the second position during unloading.

The disc used in the disc drive device is not limited to a 12 cm compact disc for music reproduction, inasmuch as an 8 cm compact disc for music reproduction may be applicable, and optical discs, magneto-optical discs, flexible magnetic discs and the like are also applicable while obtaining the same advantages.

INDUSTRIAL APPLICABILITY

The disc drive device of the present invention is applicable to disc players, disc recording and reproducing devices capable of recording on a disc, disc drive devices for compact discs, and drive devices using various types of discs such as optical discs, magneto-optical discs, flexible magnetic discs and the like.

The invention claimed is:

1. A disc drive device comprising:
 a drive gear rotated by a motor;
 a loading mechanism, including a loading transmission gear constantly engaging the drive gear, for loading and unloading a disc with drive force transmitted from the loading transmission gear;
 a pick-up moving mechanism, including a pick-up transmission gear, for moving a pick-up with drive force transmitted to the pick-up transmission gear;
 an idler gear constantly engaging the drive gear and separably engaging the pick-up transmission gear;
 a first slider moved between a first position, which is maintained when a disc is not loaded, and a second position, which is maintained when a disc is loaded, to engage the idler gear and the pick-up transmission gear when moved to the second position and to disengage the idler gear and the pick-up transmission gear when moved from the second position;
 a second slider for moving the first slider to the second position by transmitting drive force from the drive gear to the first slider located at the first position when loading the disc and moving the first slider to the first position by transmitting the drive force from the drive gear to the first slider located at the second position when unloading the disc;
a slider drive sear rotated when drive force is transmitted from the drive gear, wherein the second slider includes a rack moved together with the first slider and being swingable relative to the first slider, held engaged with the slider drive sear at a position intermediate to the first position and second position, and separably engaged with the slider drive gear at te first position and the second position; and
an urging means for urging the second slider in a direction to separate a rack from the slider drive gear.

2. The disc drive device according to claim 1, further comprising:
a loading side trigger member contacting the disc during loading and swinging the second slider located at the first position to engage the rack with the slider drive gear; and an unloading side trigger member contacting the pick-up side moving toward the center of the disc during unloading and swinging the second slider located at the second position to engage the rack with the slider drive gear.

3. The disc drive device of claim 2, wherein the unloading side trigger member stops the pick-up by moving the first slider from the second position and releases the pick-up by moving the first slider to the second position.

4. The disc drive device according to claim 1, further comprising:
a return restricting means for restricting returning of the first slider from either of the first and second positions.

5. The disc drive device according to claim 1, wherein:
the loading mechanism ends the loading operation by moving the first slider to the second position and switches to the loading operation state by moving the first slider from the second position.

6. The disc drive device according to claim 1, wherein:
the pick-up moving mechanism includes a transmission cutting means for cutting the transmission of the drive force from the pick-up transmission gear to the pick-up during the time from when the first slider moves from the second position during unloading to when the transmission of the drive force from the idler gear to the pick-up transmission gear is cut.

* * * * *